US008792005B2

(12) United States Patent
Huseth et al.

(10) Patent No.: US 8,792,005 B2
(45) Date of Patent: Jul. 29, 2014

(54) METHOD AND SYSTEM FOR AUTOMATICALLY DETERMINING THE CAMERA FIELD OF VIEW IN A CAMERA NETWORK

(75) Inventors: Steve D. Huseth, Plymouth, MN (US); Saad J. Bedros, West St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 1932 days.

(21) Appl. No.: 11/605,673

(22) Filed: Nov. 29, 2006

(65) Prior Publication Data
US 2008/0122958 A1    May 29, 2008

(51) Int. Cl.
*H04N 7/18* (2006.01)

(52) U.S. Cl.
USPC ........... 348/159; 348/146; 348/169; 348/143; 348/145; 382/103

(58) Field of Classification Search
CPC ...................... G08B 13/19689; G08B 13/1963; H04N 7/181
USPC .................................. 348/143–169; 382/103
See application file for complete search history.

(56) References Cited

U.S. PATENT DOCUMENTS

| 4,490,742 | A |   | 12/1984 | Wurtzinger ............... H04N 5/26 5/26 |
|---|---|---|---|---|
| 5,268,734 | A | * | 12/1993 | Parker et al. ............. 356/139.06 |
| 6,057,880 | A |   | 5/2000 | Schnee .................... H04N 7/18 7/18 |
| 6,167,295 | A |   | 12/2000 | Cosman ........................ 600/426 |
| 6,219,099 | B1 |   | 4/2001 | Johnson et al. ............... 348/383 |
| 6,281,930 | B1 | * | 8/2001 | Parker et al. ................ 348/211.9 |
| 6,750,902 | B1 |   | 6/2004 | Steinberg et al. ........... 348/211.3 |
| 6,873,353 | B1 |   | 3/2005 | Valkonen et al. ............... 348/88 |
| 6,980,229 | B1 | * | 12/2005 | Ebersole, Jr. .................. 348/169 |

(Continued)

FOREIGN PATENT DOCUMENTS

| DE | 9107452 U1 | 6/1992 | ............. H04N 5/247 |
|---|---|---|---|
| JP | 2003289532 A | 10/2003 | ............... H04N 7/18 |

OTHER PUBLICATIONS

E Series Camera Range, Ademco Video 2" Color Dome Camera, Ademco Video Digital Video Integrator (R160), Specification Data, Honeywell Inc. Honeywell Digital Video Manager, Honeywell International Inc.

(Continued)

*Primary Examiner* — Wing F Chan
*Assistant Examiner* — Razu Miah
(74) *Attorney, Agent, or Firm* — Kermit D. Lopez; Tuesday A. Kaasch; Luis M. Ortiz

(57) ABSTRACT

A system and method for automatically determining the camera field of view in a camera network. The system has a plurality of spatially separated cameras and direction sensors, carried on respective cameras, configured to measure the angle directions of the field of views of the cameras. Elevation sensors are operably coupled to respective cameras to measure the elevation angles of thereof. A controller is configured to process direction and elevation measurement signals transmitted from the cameras to automatically determine the cameras' fields of views. One or more cameras having a field of view containing or nearby an event of interest can be selected from the determined field of views and indicated to a user via a graphical user interface. Selected cameras which are rotatably mounted can be rotated if need be to automatically bring the event of interest into the field of views of the selected cameras.

17 Claims, 7 Drawing Sheets

TOP VIEW

(56) References Cited

U.S. PATENT DOCUMENTS

| | | | |
|---|---|---|---|
| 7,057,636 B1* | 6/2006 | Cohen-Solal et al. | 348/14.08 |
| 7,489,806 B2* | 2/2009 | Mohri et al. | 382/107 |
| 7,697,025 B2* | 4/2010 | Hasegawa et al. | 348/143 |
| 7,884,849 B2* | 2/2011 | Yin et al. | 348/143 |
| 2002/0052708 A1* | 5/2002 | Pollard et al. | 702/151 |
| 2003/0040815 A1 | 2/2003 | Pavlidis | 700/48 |
| 2003/0043479 A1* | 3/2003 | Su et al. | 359/843 |
| 2003/0174206 A1* | 9/2003 | Moroz | 348/81 |
| 2003/0193562 A1* | 10/2003 | Corzillus | 348/148 |
| 2003/0202101 A1 | 10/2003 | Monroe et al. | H04N 7/18 7/18 |
| 2003/0234860 A1* | 12/2003 | Sung et al. | 348/143 |
| 2004/0006424 A1* | 1/2004 | Joyce et al. | 701/207 |
| 2004/0078166 A1* | 4/2004 | Shin | 702/145 |
| 2004/0096084 A1* | 5/2004 | Tamoto et al. | 382/104 |
| 2004/0100563 A1* | 5/2004 | Sablak et al. | 348/211.4 |
| 2004/0207729 A1* | 10/2004 | Takagi et al. | 348/152 |
| 2004/0252194 A1* | 12/2004 | Lin | 348/169 |
| 2004/0263609 A1 | 12/2004 | Otsuki et al. | 348/14.02 |
| 2005/0109959 A1* | 5/2005 | Wasserman et al. | 250/559.19 |
| 2005/0237388 A1* | 10/2005 | Tani | 348/143 |
| 2005/0244033 A1* | 11/2005 | Ekin et al. | 382/103 |
| 2005/0270375 A1 | 12/2005 | Poulin et al. | 348/187 |
| 2005/0275723 A1* | 12/2005 | Sablak et al. | 348/169 |
| 2006/0007308 A1* | 1/2006 | Ide et al. | 348/143 |
| 2006/0056056 A1* | 3/2006 | Ahiska et al. | 359/690 |
| 2006/0066295 A1* | 3/2006 | Tamura et al. | 324/202 |
| 2006/0115115 A1* | 6/2006 | Nagaoka et al. | 382/103 |
| 2006/0139453 A1* | 6/2006 | Spinelli | 348/143 |
| 2006/0152584 A1* | 7/2006 | Wang et al. | 348/143 |
| 2006/0203098 A1* | 9/2006 | Henninger et al. | 348/211.99 |
| 2006/0256201 A1* | 11/2006 | Shuttleworth | 348/211.9 |
| 2006/0259933 A1* | 11/2006 | Fishel et al. | 725/105 |
| 2007/0035623 A1* | 2/2007 | Garoutte et al. | 348/143 |
| 2007/0039030 A1* | 2/2007 | Romanowich et al. | 725/105 |
| 2007/0076944 A1* | 4/2007 | Bryll et al. | 382/152 |
| 2007/0188650 A1* | 8/2007 | Kobayashi et al. | 348/344 |
| 2007/0273372 A1* | 11/2007 | Butzmann | 324/252 |
| 2008/0031514 A1* | 2/2008 | Kakinami | 382/154 |
| 2008/0049105 A1* | 2/2008 | Shimizu et al. | 348/148 |
| 2008/0272771 A1* | 11/2008 | Guo et al. | 324/260 |

OTHER PUBLICATIONS

PCT—Notification of Transmittal of the International Search Report and the Written Opinion of the International Searching Authority, or the Declaration, Date of Mailing Jun. 5, 2008.

* cited by examiner

METHOD AND SYSTEM FOR AUTOMATICALLY DETERMINING THE CAMERA FIELD OF VIEW IN A CAMERA NETWORK

TECHNICAL FIELD

Embodiments relate to methods and systems for configuring device networks and, more particularly, to systems and methods for automatically determining the camera field of view in a camera network, such as a video based camera network. Also, embodiments relate to techniques for configuring cameras with a field of view that contains the event of interest.

BACKGROUND

Advances in digital video camera technology have resulted in high quality cameras with lower cost and greater image resolution. This has permitted facility owners to deploy an increasing number of cameras that must be monitored by a fixed size security staff. Critical to making the existing staff as productive as possible is to provide additional information on which cameras have the most important information. When an event of interest occurs within a facility or compound, providing a mechanism to select the cameras with a field of view that contains the event of interest is a significant capability. This requires cameras to be aware of their direction in relationship to the compound or facility and elevation angle.

Although requiring the camera installer to note the camera direction and angle could be entered into a database and used to automatically point a camera to an event of interest, maintaining such information in large camera systems is difficult and expensive requiring additional labor. Furthermore, cameras are frequently moved or added incrementally causing the information to be incorrect or non-existent. Cameras that have pan-tilt-zoom (PTZ) capability can be repositioned to view an event of interest but must be positioned relative to how they are initially mounted. This lack of spatial reference with respect to the rest of the facility or compound and increases the work load for the security staff.

The embodiments disclosed herein therefore directly address the shortcomings of known camera networks by providing a system and method for automatically determining the camera field of view of a camera network.

BRIEF SUMMARY

It is therefore one aspect of the embodiments to provide for a method for automatically determining a camera field of view in a camera network.

It is therefore another aspect of the embodiments to provide for a system for automatically determining a camera field of view in a camera network.

The aforementioned aspects and other objectives and advantages can now be achieved as described herein.

In one aspect, a system for automatically determining a camera field of view in a camera network has a plurality of spatially separated cameras and direction sensors carried on respective cameras. The direction sensors can be configured to measure the angle directions of the fields of views of the cameras and generate corresponding direction measurement signals. The system also includes elevation sensors operably coupled to respective cameras to measure the elevation angles of the cameras and generate corresponding elevation measurement signals. A controller can be operably linked to the cameras for processing the direction and elevation measurement signals to thereby enable the field of views of the cameras to be automatically determined.

Advantageously, incorporating the direction and elevation angle sensors into the cameras enables the controller to automatically determine the field of view of the cameras without reference to the camera initial mounting position so that an installer is no longer required to measure and enter camera field of view or mounting position data during installation.

The direction sensors can be magnetometer sensors configured to measure the angle directions of the field of views relative to magnetic north or other types of magnetic angle sensors, such as AMR sensors. The elevation sensors can be resistive sensors or magnetic angle sensors.

The controller can be configured to select one or more cameras having a field of view containing an event of interest based on the at least one camera's direction and elevation measurements being substantially equal to respective horizontal and vertical camera-event bearings between the at least one camera and the event of interest. Advantageously, configuring the controller to compare the cameras' direction and elevation angles with camera-event horizontal and vertical bearings enables one or more cameras having a field of view containing the event of interest to be automatically selected.

The system can include a graphical user interface, operably connected to the controller, for displaying a plan or map representing the spatial relationship between the cameras. The controller can be further configured to indicate on the plan or map the selected camera(s).

The camera-event horizontal and vertical bearings can be calculated using trigonometry from predetermined vertical and horizontal position information of the at least one camera and the event of interest.

The controller can be further configured to determine the amount of horizontal and/or vertical rotation required to bring an event of interest into the field of view of one or more cameras based on a comparison of the selected camera direction and elevation measurements with respective predetermined camera-event horizontal and vertical bearings between the one or more cameras and the event of interest.

The cameras can include respective rotation devices, operably linked to the controller, for horizontally and/or vertically rotating the cameras in response to control signals received from the controller. The controller can be configured to send the control signals to the one or more cameras to horizontally and/or vertically rotate the camera(s) by the determined amounts of horizontal and/or vertical rotation to bring the event of interest into the field of view of the one or more cameras. Advantageously, events of interest outside the field of view of the one or more cameras can be captured automatically by the system rotating the one or more cameras to bring the event of interest into the respective camera's field of view.

The cameras can comprise pan tilt zoom cameras in which case the determined amounts of horizontal and/or vertical rotation are calculated in terms of the number of degrees of panning and/or tilting required to bring the event of interest into the field of view of the one or more pan tilt zoom cameras.

According to another aspect, a camera system for use in a system for automatically determining a camera field of view in a camera network has a camera and a direction sensor carried on the camera. The direction sensor can be configured to measure the angle direction of the field of view of the camera relative to magnetic north and generate a corresponding direction signal. The direction sensor can be for example a magnetometer sensor. The camera system can include an elevation sensor operably coupled to the camera to measure the elevation angle of the at least one camera and generate a corresponding elevation signal. The elevation sensor can be for example a resistive sensor, such as a potentiometer, or a magnetic angle sensor.

According to yet another aspect, a method for automatically determining a camera field of view in a camera network comprises measuring respective angle directions of the fields of views of a plurality of spatially separated cameras relative to magnetic north; generating direction measurement signals corresponding to the measured angle directions; measuring respective elevation angles of the spatially separated cameras; and generating elevation measurement signals corresponding to the measured elevation angles. Advantageously, measuring the cameras' direction and elevation angles enables the fields of view of the cameras to be determined automatically without having to determine the camera initial mounting positions during camera installation.

Measuring respective angle directions of the fields of view of the cameras can comprise measuring the angle directions of the cameras relative to magnetic north using a magnetometer. Measuring respective elevation angles can comprise measuring the elevation angles of the cameras using a resistive sensor or magnetic angle sensor.

The method can further comprise selecting one or more cameras having a field of view nearby or containing an event of interest based on a the one or more camera's direction and elevation measurements being substantially equal to respective camera-event horizontal and vertical bearings between the one or more cameras and the event of interest. Comparing the camera's direction and elevation angles with camera-event horizontal and vertical bearings enables one or more cameras having a field of view containing the event of interest to be automatically selected.

The method can further comprise displaying a plan or map with the plurality of cameras annotated thereon. Also, the method can include indicating one or more selected cameras on the plan or map.

The camera-event horizontal and vertical bearings can be calculated using trigonometry from predetermined vertical and horizontal position information of the cameras and the event of interest The method can further comprise determining the amount of horizontal and/or vertical rotation required to bring an event of interest into the field of view of one or more cameras based on a comparison of the direction and elevation measurements with respective predetermined camera-event horizontal and vertical bearings between the one or more cameras and the event of interest. Also, the method can further comprise horizontally and/or vertically rotating the one or more cameras by the determined amounts of horizontal and/or vertical rotation to bring the event of interest into the field of view of the one or more cameras.

The one or more camera(s) can be pan tilt zoom camera(s). The method can further comprise determining the number of degrees of panning and/or tilting required to bring the event of interest into the field of view of the one or more pan tilt zoom cameras. The method can further comprise panning and/or tilting the one or more pan tilt zoom cameras by the determined amounts of panning and/or tilting to bring the event of interest into the field of view of the one or more pan tilt zoom cameras.

BRIEF DESCRIPTION OF THE DRAWINGS

The accompanying figures, in which like reference numerals refer to identical or functionally similar elements throughout the separate views and which are incorporated in and form a part of the specification, further illustrate the embodiment, together with the background, brief summary, and detailed description, serve to explain the principles of the illustrative embodiment.

DETAILED DESCRIPTION

The system and method for automatically determining the camera field of view in a camera network of the illustrative embodiments provides an approach to enable cameras to automatically determine their field of view without requiring installers or other users to obtain and input additional field of view information into the camera network. Furthermore, the approach enables the camera network to automatically select one or more cameras with a field of field containing an event of interest in proximity to the one or more cameras. Using this approach, events of interest outside the fields of views of particular cameras can be captured automatically by rotating the particular cameras to bring the event of interest into their fields of views.

In order to explain the system and method for automatically configuring the camera field of view in a camera network according to the illustrative embodiment, reference will first be made to a camera network in which the system and method can be implemented.

Figure 1:
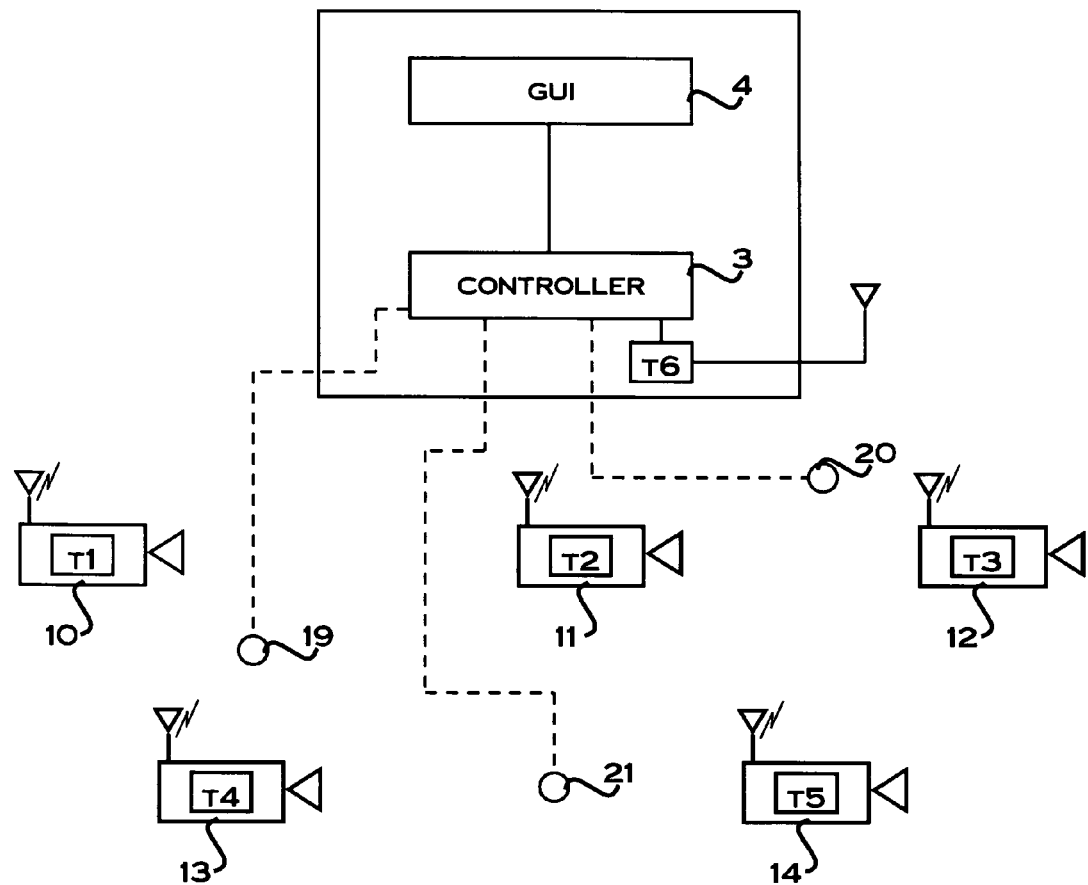
FIG. 1 illustrates a schematic of a system for automatically determining the camera field of view in a camera network according to a preferred embodiment.

Referring to FIG. 1 of the accompanying drawings, which illustrates a system for automatically determining the camera field of view in a camera network according to the illustrative embodiment, system 1 is implemented in a camera network having a plurality of spatially separated cameras 10-14 operably linked to a controller 3. As will be explained in more detail below with reference to FIGS. 3 and 4, direction sensors 50, carried on respective cameras, are configured to measure the angle directions of the field of views of the cameras and to generate corresponding direction measurement signals, and elevation sensors 51 are operably coupled to respective cameras to measure the elevation angles of the cameras and generate corresponding elevation measurement signals. Controller 3 is configured to process direction and elevation measurement signals transmitted from the cameras to thereby enable the field of views of the cameras to be automatically determined.

Advantageously, incorporating the direction and elevation angle sensors into the cameras enables the controller to automatically determine the fields of views of the cameras without reference to the camera initial mounting position.

In the system of the illustrative embodiment shown in FIG. 1, controller 3 is a video control and management system, such as the Digital Video Manager System of Honeywell International Inc. 101 Columbia Road, Morristown, N.J. 07962, USA, which is operable on one or more PCs or servers, and can be configured to transmit and receive camera data, in addition to camera direction and elevation data, to control and manage camera functions, such as camera recording and live viewing. Alternatively, controller 3 can be implemented as a dedicated controller for example on a dedicated microcontroller such as an ASIC, or other type of processor, to control the cameras' direction and elevation angle.

Figure 6:
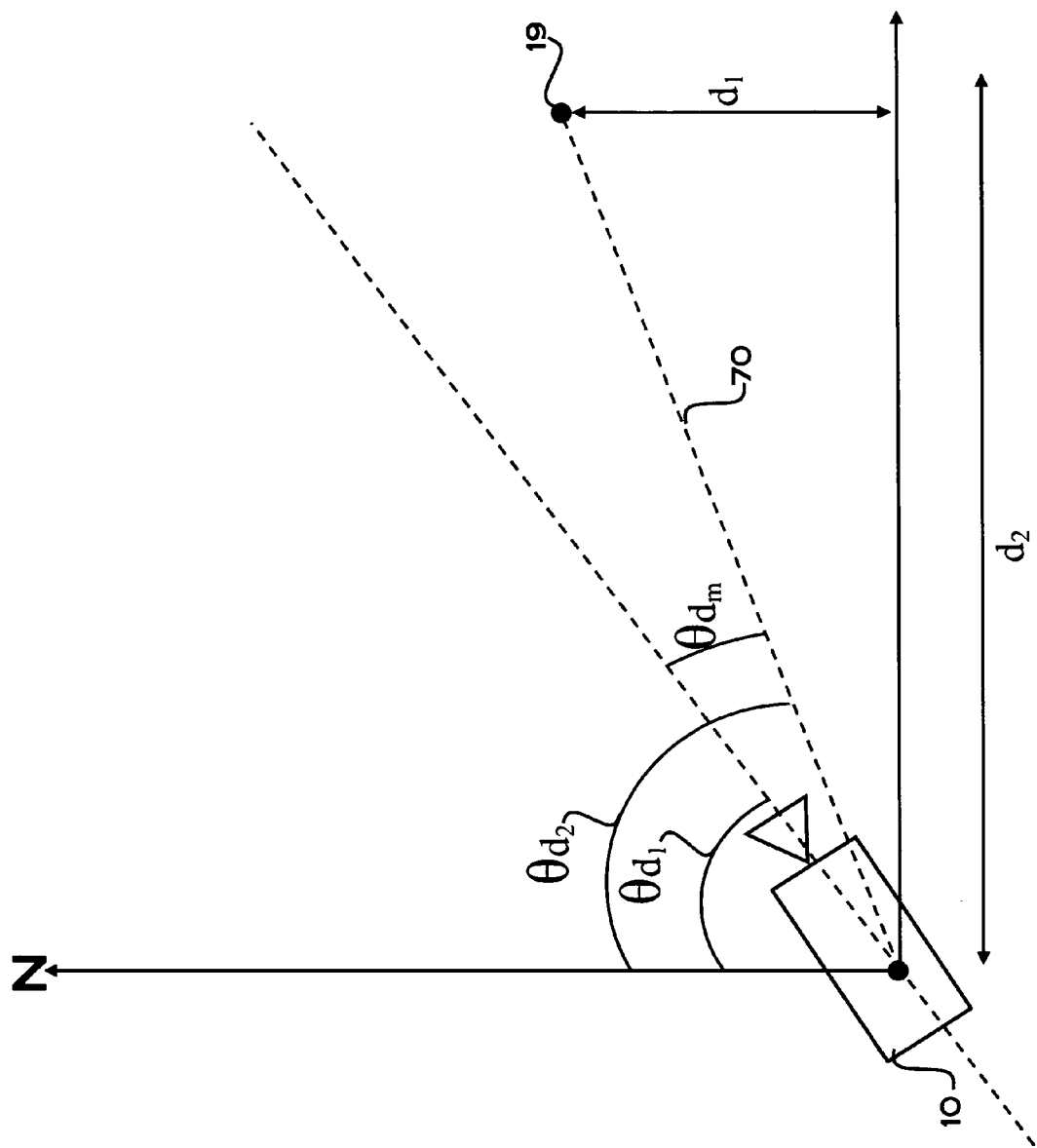
FIGS. 6 and 7 illustrate an example of part of a facility map showing top and side plan views, respectively, of a camera of FIG. 1 whose field of view is being controlled in order to bring an event of interest into the camera's field of view according to one embodiment.
Figure 7:
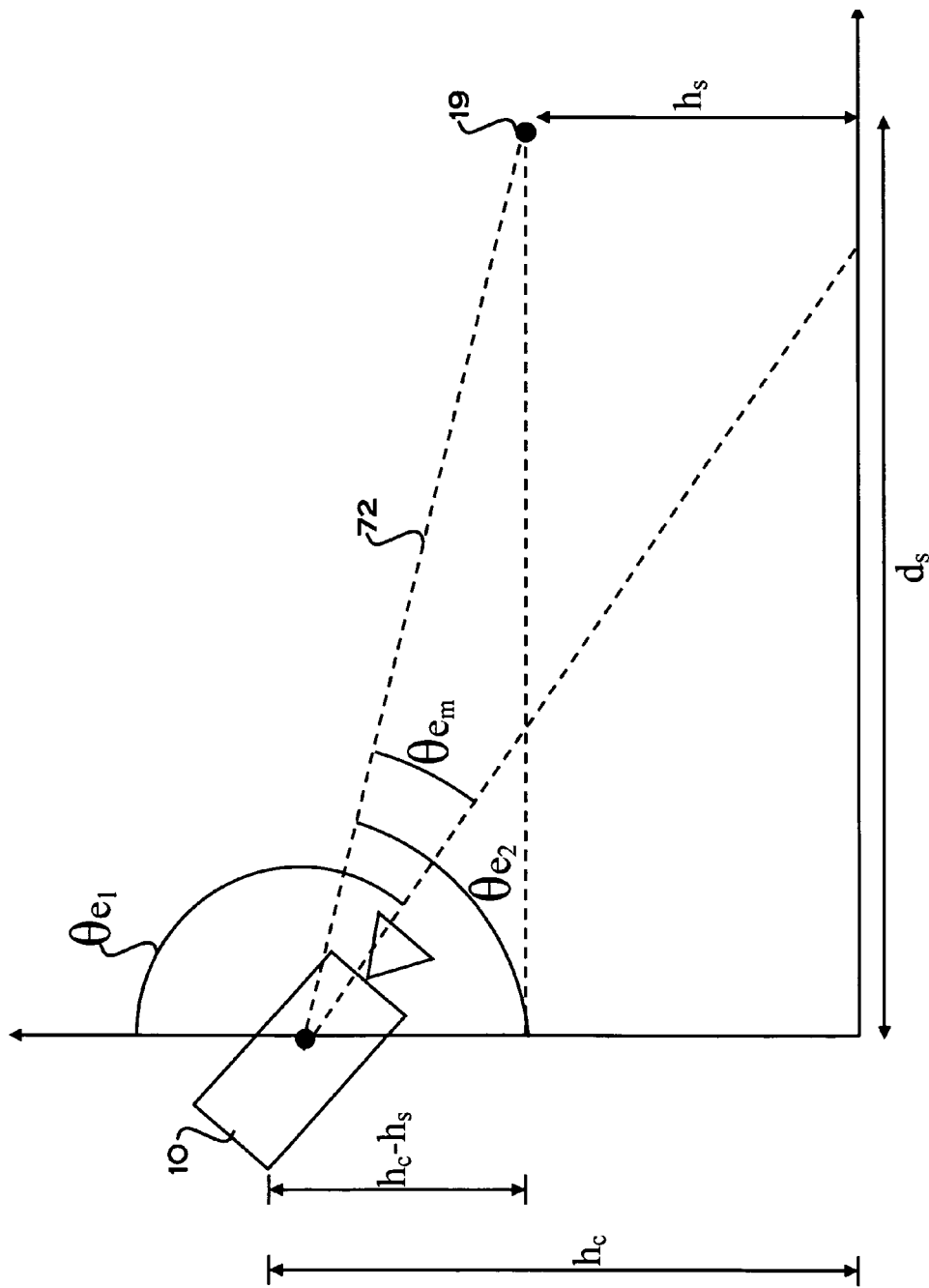

Camera location information is typically annotated on a facility map which is rendered on a display via a graphical user interface 4 linked to controller 3. The facility map indicates the spatial relationship between cameras and can also indicate events of interest and/or sensors for detecting such events of interest in the vicinity of the cameras. An example of such a facility map is depicted in FIGS. 6 and 7, which illustrate parts of a facility map showing a top and plan views of a camera and an event sensor annotated thereon.

Also in the illustrative embodiment of FIG. 1, cameras 10-14 are rotateably mounted cameras such as a closed circuit digital television pan tilt zoom (PTZ) camera. One example of such a camera is video system camera HD2FC1 from Honeywell International Inc. 101 Columbia Road, Morristown, N.J. 07962, USA. However, any type of rotateably mounted or other movably mounted camera which is suitable for adjusting the camera's direction and elevation angle can be used.

Cameras 10-14 and controller 3 are operably linked by RF transceivers T1-T6, integrated in the cameras and the controller 3, which are arranged to pass position data from camera to camera and camera to controller through a wireless mesh network implemented, for example, as a TCP/IP network over the Ethernet. Alternatively, cameras 10-14 and controller 3 can be operably linked wirelessly using other types of wireless technology known in the art or hardwired together. Also, camera data for controlling camera functions can be transmitted between the cameras and the controller either using wires or wireless communication. If the cameras are analog, the camera data is transmitted using a separate communication channel from the position data. However, with digital cameras, the position data can be sent along with the camera data using the same communication channels.

The controller 3 can also be operably linked to a plurality of sensors 19-21 deployed at predetermined locations for sensing events of interest in the proximity of the sensors. For example, if the camera network is installed inside a building, the sensors may be for example emergency smoke or gas detectors for sensing fires and other hazardous conditions in the building or security sensors for sensing the opening or closing of the building windows or doors. The position coordinates of the sensors 19-21 are predetermined and available to the controller 3.

Figure 2:
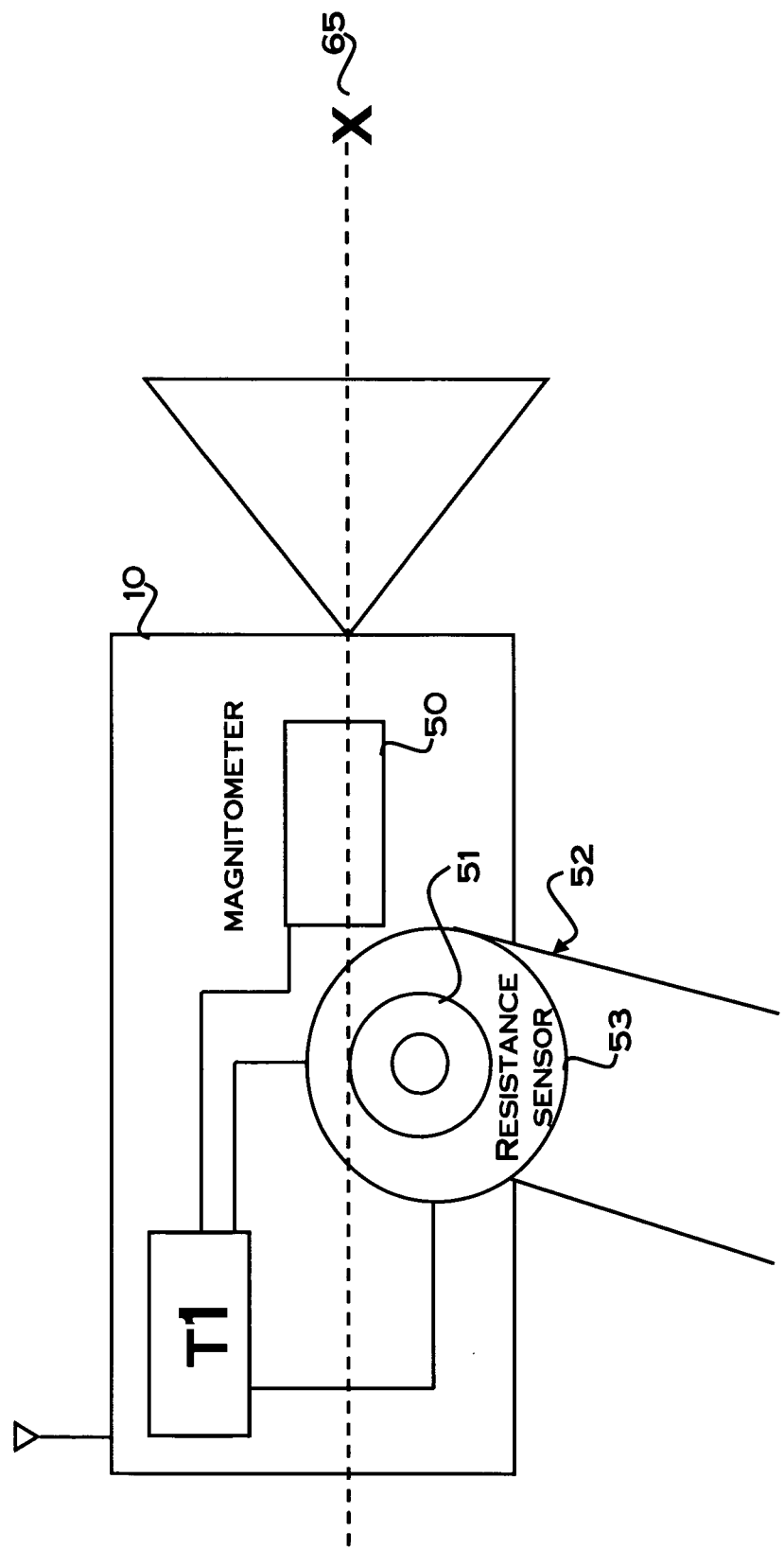
FIG. 2 illustrates a magnetometer sensor and resistive sensor coupled to one of the cameras shown in FIG. 1 according to one embodiment.
Figure 3:
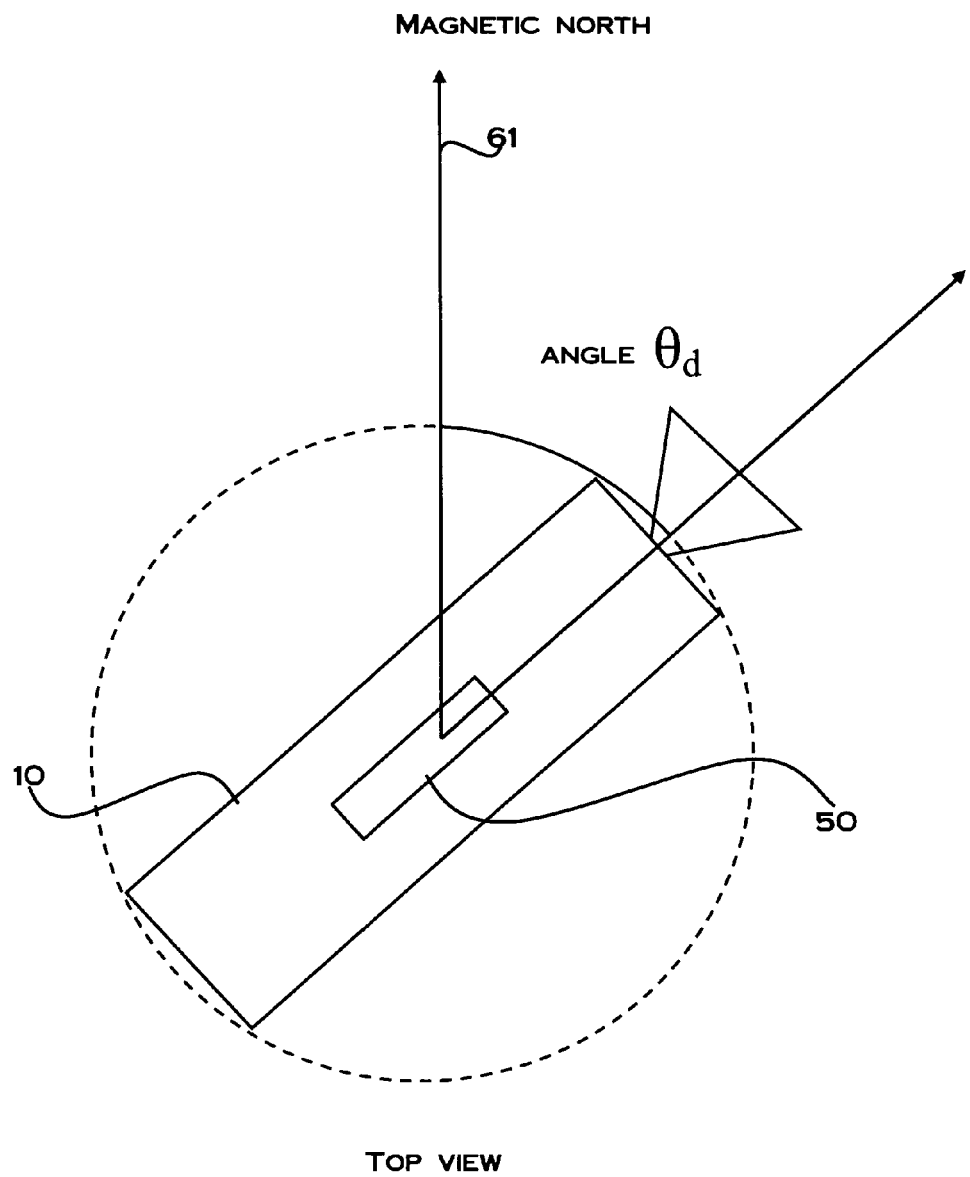
FIGS. 3 and 4, depict plan top and side views of the camera of FIG. 2 showing the direction and elevation angles of the camera in a mounted position.
Figure 4:
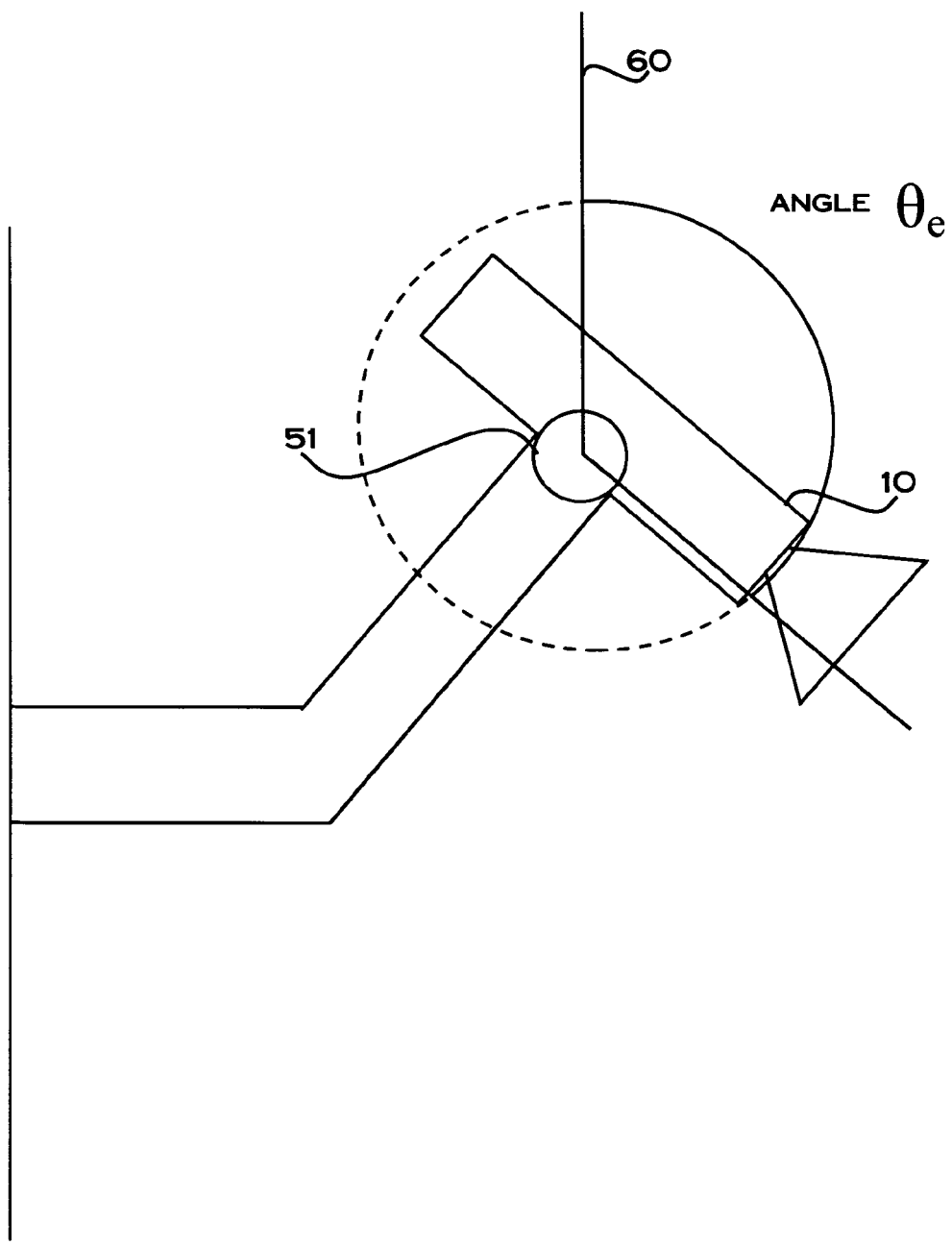

Referring now to FIG. 2-4, which illustrate in more detail schematics of one of the rotateably mounted cameras 10 of FIG. 1, camera 10 is rotateably mounted to mounting fixture 52 using a camera rotation device 53 of the type for example found on known PTZ cameras. The rotation device is capable of rotationally controlling the camera direction and elevation angle using electric motors in response to electrical control signals.

Camera 10 includes a direction sensor 50 in the form of a magnetometer sensor 50, which is arranged to measure the camera direction angle $\theta_d$ relative to magnetic north 61, and an elevation sensor 51 in the form of a resistance sensor 51, which is arranged on the camera rotating mechanism 53 to measure the elevation angle $\theta_e$ relative to a vertical reference direction corresponding to the camera pointing directly vertically upwards. The term camera direction is used herein to refer the horizontal direction angle $\theta_d$ or bearing of the camera relative to magnetic North and the term elevation angle is used herein to refer to the vertical angle $\theta_e$ of the camera relative to the vertical axis.

Magnetometer sensor 50 is pre-aligned with the camera field of view, which for the purpose of the illustration is assumed to be a virtual point 65 in space at which the camera is directly pointing, such that the sensor 50 will provide data indicating the offset of the field of view from magnetic North. The magnetometer sensor may be powered by the camera power source (not shown) which can be for example a local battery source integrated in the camera or a remote external power supply connected to the camera. A direction sensor other than magnetometer sensor 50 can be employed to measure the field of view of the camera. For example, a magnetoresisitive position sensor such as magnetoresistive AMR sensor can be utilized to measure the angle direction relative to magnetic North.

The resistance sensor 51 can be for example a rotary potentiometer which is mechanically coupled to the rotation device 53 and camera 10 such that the potentiometer rotary arm rotates with the elevation rotation of the camera and controls the voltage output of an electrical circuit in which the rotary potentiometer is arranged. The potentiometer produces a digital or analog output related to the angle of the camera mounting bracket. The resistance sensor electrical circuit can also be powered by the camera power source. An elevation sensor other than a resistive sensor 50 can be employed to measure the field of view of the camera. For example, the elevation angle can be measured utilizing a magnetic angle sensor, such as a magnetoresistive AMR sensor.

The direction sensor 50 and elevation sensor 51 of camera 10 are electrically coupled to transceiver T1 such that output position signals or data corresponding to measured direction and elevation angles $\theta_d$, $\theta_e$ from respective direction and elevation sensors can be wirelessly fed back to the controller 3 for processing. Rotation device 53 is also electrically coupled to transceiver T1 and rotationally controls the direction and elevation angle of the camera in response to received control signals wirelessly transmitted from the controller to the camera.

Direction sensors 50 and elevation sensors 51 are also mounted to the other cameras 11-14 and their rotation devices in the same manner as those of camera 10. Controller 3 is configured to be able to receive from each of the camera transceivers T1-T4 position signals or data corresponding to the measured direction and elevation angles of the respective cameras (see FIG. 1). Transceivers T1-T4 are also configured to transmit identifying signals to the controller 3 to enable the controller to distinguish direction and elevation signals sent from different cameras. As will be explained in more detail below, controller 3 is configured to be able select one or more cameras 10-14 having a field of view containing an event of interest and, if necessary, to control the horizontal and vertical rotational camera motion of one or more cameras 10-14 to bring the particular event of interest into the field of view of the camera.

Figure 5:
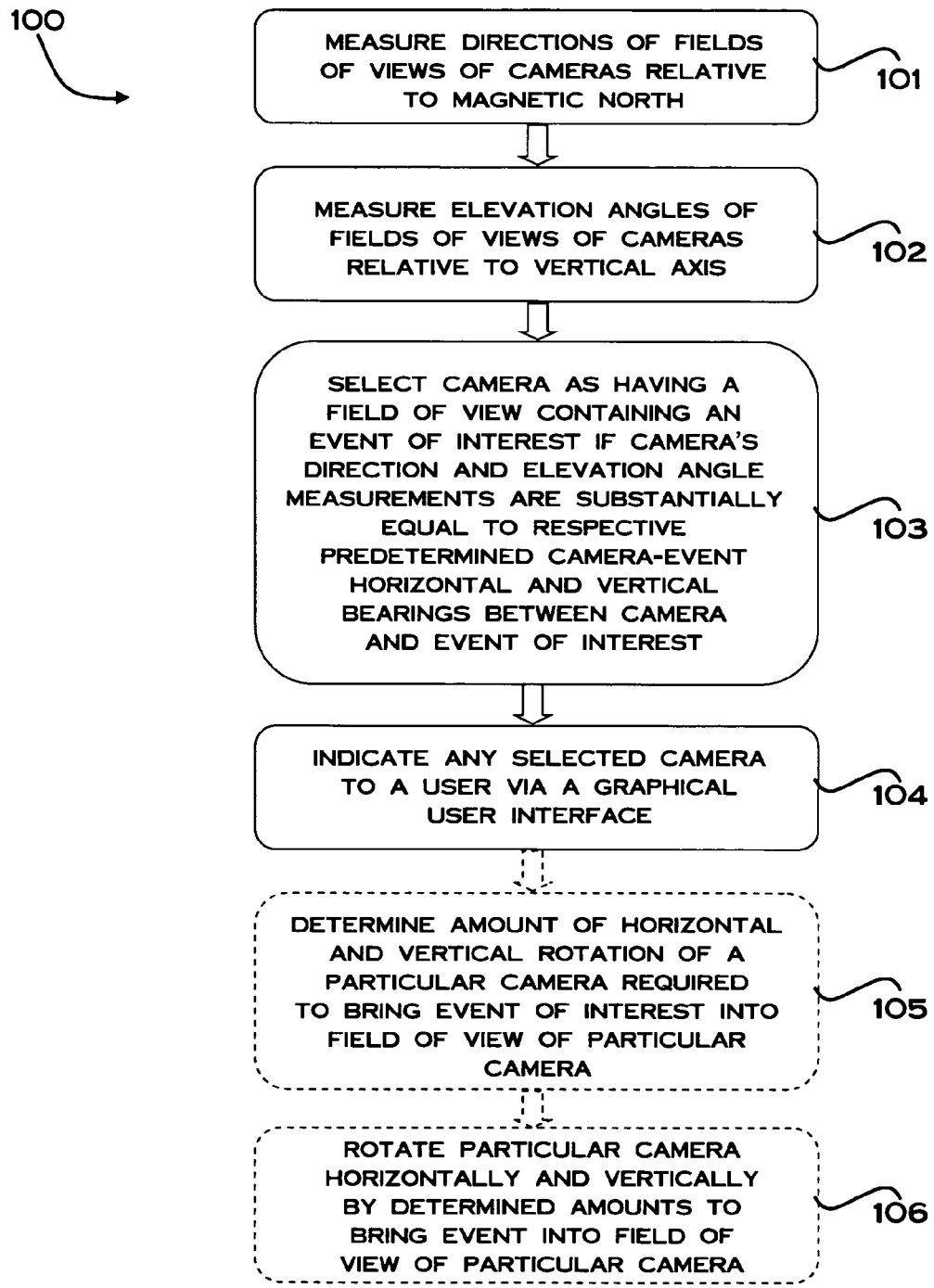
FIG. 5 illustrates a flow diagram outlining the general steps of a method for automatically configuring the camera field of view in a camera network.

A method for automatically determining the camera field of view in a camera network to contain an event of interest according to one embodiment will now be described referring to FIG. 5, which illustrates a flow diagram outlining the general steps of the method. Method 100 is initiated by measuring directions of cameras relative to magnetic field north, as indicated in process step 101. The elevation angles of the cameras are measured, as indicated in process step 102. As indicated in step 103, if a particular camera's direction and elevation angle measurements are substantially similar or equal to respective camera-event horizontal and vertical bearings between the particular camera and the event of interest, the particular camera is selected as having a field of view containing the event of interest. Thereafter, any selected camera is presented to a user via a graphical user interface, as indicated in step 104. Method steps 103 and 104 can be repeated to select any other cameras having a field of view containing the event of interest.

Optionally, if the event of interest is outside the field of view of one or more cameras, the amount of horizontal and vertical camera rotation required to bring the event of interest into the field of view of the one or more cameras can also be determined. This is achieved in step 105 by comparing a particular camera's direction and elevation angles to respective predetermined camera-event horizontal and vertical bearings between the particular camera and the event of interest. In order to determine the degrees of horizontal and vertical rotational camera motion required to bring the event of interest into the field of view of the camera. Thereafter, the particular camera is rotated according to the amount of horizontal and vertical camera motion determined in step 105 to bring the event of interest into the field of view of the particular camera, as indicated in step 106.

Process steps 105 and 106 are optional and can be implemented for example if none of the cameras in the camera network have a field of view containing the event of interest or if there is a need to have the event of interest contained in the field of view of other particular cameras in addition to those already selected in step 103.

Method 100 can be implemented for example in the system of FIG. 1. System 1 implements process step 101 of method 100 by the direction sensors of cameras 10-14 measuring the cameras' direction angles ($\theta_d$) either continuously or for example in response to an update request from the controller 3. System 1 implements step 102 by the elevation sensors of cameras 10-14 measuring the cameras' elevation angles ($\theta_e$). System 1 implements process step 103 by the controller 3 selecting a particular camera as having a field of view containing an event of interest if the particular camera's direction and elevation angle measurements are substantially similar or equal to respective camera-event horizontal and vertical bearings between the particular camera and the event of interest. The camera-event bearings are calculated trigonometrically based on predetermined camera locations and the event of interest location pre-stored in or inputted to the controller 3.

In order to more adequately explain implementation of process step 103 in system 1 let us assume by way of example that an event of interest sensed at sensor 19 is outside the field of view of camera 10. Let us also assume that the present actual direction of camera 10 relative to magnetic north measured by the magnitosensor 50 is $\theta_{d1}$ and that the present actual elevation angle of camera 10 measured by the resistive sensor 51 is $\theta_{e1}$, as indicated in FIGS. 6 and 7, respectively.

The horizontal camera-event horizontal bearing between camera 10 and sensor/event 19 is defined as the horizontal angle $\theta_{bd2}$ of a virtual line 70 in the horizontal plane pointing from the camera location point to the sensor/event location point relative to magnetic north (see FIG. 6). The controller 3 determines from pre-stored Cartesian coordinate data the relative horizontal distances ($d_1$ and $d_2$), parallel and perpendicular to magnetic north, respectively, between the sensor/event and camera so that the controller can calculate trigonometrically the camera-to-event horizontal bearing $\theta_{d2}$ by solving the following equation:

$$\tan\theta_{d2} = \frac{d_2}{d_1} \qquad \text{Equation 1.}$$

where: $d_1$ and $d_2$ are the relative horizontal distances parallel and perpendicular to magnetic north, respectively, between the sensor/event and camera, and $\theta_{d2}$ is the camera-to-event horizontal bearing $\theta_{d2}$ Also by way of example, for camera 10, the camera-event vertical bearing between camera 10 and the sensor/event 19 is the vertical angle $\theta_{e2}$ of a virtual line 72 pointing from the camera to the sensor 19 relative to the vertical axis (see FIG. 7). The controller 3 determines the mounting heights $h_c$ and $h_s$ of the camera 10 and sensor/event 19, respectively, and the relative horizontal distance $d_{cs}$ between the camera 10 and sensor/event 19 from predetermined data stored in the controller 3 and then calculates $\theta_{e2}$ by solving the following trigonometric equation:

$$\tan\theta_{e2} = \frac{d_{CS}}{h_C - h_S} \qquad \text{Equation 2.}$$

where: $h_c-h_s$ is the relative height between the camera and the sensor/event, and $d_{cs}$ is the relative horizontal distance between the camera and sensor/event Controller 3 determines from these calculations that the measured direction angle $\theta_{d1}$ is not substantially equal to the calculated horizontal bearing angle $\theta_{d2}$ and also the measured elevation angle $\theta_{e1}$ is not substantially equal to the calculated vertical bearing angle so that the controller determines that the sensor/event 19 is not contained in the field of view of camera 10 and therefore camera 10 is not selected by the controller.

In order to fully implement process step 103, the controller 3, for each other camera 11-14, compares the measured camera direction and elevation angles $\theta_{d1}$, $\theta_{e1}$ with the calculated camera-to-event vertical and horizontal angles $\theta_{d2}$, $\theta_{e2}$, respectively. If for a particular camera, the measured direction angle $\theta_{d1}$ is substantially equal to the calculated horizontal bearing angle $\theta_{d2}$ and also the vertical measured elevation angle $\theta_{e1}$ is substantially equal to the calculated vertical bearing angle $\theta_{e1}$, the controller 3 determines that the event is contained in the field of view of the particular camera and accordingly selects the camera.

System 1 implements process step 104 by the controller 3 annotating any selected cameras on the facility map which is rendered on the graphical user interface 4.

In the particular example of FIGS. 6 and 7, the sensor/event 19 is outside the field of view of camera 10 so that system 1 can optionally proceed to implement process step 105 to bring the event of interest into the field of view of camera 10. The horizontal angle difference $\theta_{dm}$ and vertical angle difference $\theta_{em}$ determined by the controller 3 correspond to the horizontal and vertical rotational angles, respectively, through which camera 10 must rotate in order to point at sensor/event 19 and thereby bring the event of interest into the field of view of the camera (see FIGS. 6 and 7). System 1, having determined the number degrees of horizontal and vertical rotation $\theta_{dm}$, $\theta_{em}$ to bring the event of interest into the field of view of camera 10, implements process step 106 by sending control signals to the camera 10 to pan and tilt the camera by the required degrees so that the camera field of view is point directly at the sensor 19 (event of interest) thereby bringing the event of interest into the field of view of the camera. System 1 can repeat steps 105 and 106, if need be, to bring the event of interest into the field of view of other cameras.

A system for determining the camera field of view in a camera network according to an alternative embodiment is identical to system 1 of FIG. 1 with the exception that the cameras of the system are permanently fixed in position. The system according to the alternative embodiment is capable of implementing a method of determining the field of view of a camera which is similar to method 100 but with steps 105 and 106 omitted. Thus, the system which uses fixed cameras can select one or more cameras having a field of view containing an event of interest and present the selected camera on a facility map in the same manner as system 1 of FIG. 1.

Other variations and modifications of the present invention will be apparent to those of skill in the art, and it is the intent of the appended claims that such variations and modifications be covered.

For example, the camera network can have any number of a plurality of cameras and is not limited to the number of cameras in the system of the illustrative embodiment of FIG. 1. Furthermore, the system and method for determining the camera field of view in a camera network can be implemented without sensors 19-21 by using locations of the events of interest determined by for example measuring the location and inputting the measured location into the controller.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A system for automatically determining a camera field of view in a camera network, said system comprising:
   a plurality of spatially separated cameras,
   direction sensors associated with said cameras, configured to measure a horizontal camera direction angle with respect to magnetic north for the field of view of said cameras and to generate corresponding direction measurement signals;
   elevation sensors coupled to respective said cameras to measure elevation angles for the field of view with respect to a vertical axis and to generate corresponding elevation measurement signals;
   a controller, linked to said cameras and a plurality of physical condition sensors, for processing said direction and elevation measurement signals to automatically determine the fields of views of said cameras;
   wherein said controller is further configured to determine the amount of horizontal and/or vertical rotation required to bring an event of interest into the field of view of at least one camera based on a comparison of the at least one camera's direction and elevation measurements to respective predetermined camera-event horizontal and vertical bearings between at least one camera and said event of interest; and
   a facility map containing location information for each of said plurality of spatially separated cameras wherein said facility map is rendered on a graphical user interface display linked to said controllers.

2. The system of claim 1, wherein said direction sensors comprise magnetometer sensors.

3. The system of claim 2, wherein said elevation sensors comprise resistive sensors or magnetic angle sensors.

4. The system of claim 1, wherein said controller is configured to select at least one camera having a field of view containing an event of interest based on the at least one camera's direction and elevation measurements being substantially equal to the horizontal and vertical camera-event bearings between the at least one camera and said event of interest.

5. The system of claim 4, further comprising a graphical user interface operably connected to said controller,
   wherein said controller is further configured to indicate said selected camera(s) to a user via said graphical user interface.

6. The system of claim 4, wherein said camera-event horizontal and vertical bearings are calculated using trigonometry from predetermined vertical and horizontal position information of said camera(s) and said event of interest.

7. The system of claim 1, wherein said camera(s) include respective rotation devices, operably linked to said controller, for horizontally and/or vertically rotating said cameras in response to control signals received from said controller; and
   wherein said controller is configured to send said control signals to said at least one selected camera to horizontally and/or vertically rotate said at least one camera by said determined amounts of horizontal and/or vertical rotation to bring said event of interest into the field of view of said at least one camera.

8. The system of claim 7, wherein said camera(s) comprise pan tilt zoom cameras; and
   wherein said determined amounts of horizontal and/or vertical rotation are calculated in terms of the number of degrees of panning and/or tilting required to bring said event of interest into the field of view of said at least one selected pan tilt zoom camera.

9. A camera system for use in a system for automatically determining a camera field of view in a camera network; said camera system comprising:
   a camera,
   a direction sensor associated with said camera, configured to measure horizontal camera direction angle with respect to magnetic north for the field of view of said camera and to generate a corresponding direction signal;
   an elevation sensor operably coupled to said camera to measure an elevation angle with respect to a vertical axis and to generate a corresponding elevation signal;
   a controller, linked to said cameras and a plurality of physical condition sensors, for processing said direction and elevation measurement signals to automatically determine the fields of views of said cameras;
   wherein said controller is further configured to determine the amount of horizontal and/or vertical rotation required to bring an event of interest into the field of view of at least one camera based on a comparison of the at least one camera's direction and elevation measurements to respective predetermined camera-event horizontal and vertical bearings between at least one camera and said event of interest; and
   a facility map containing location information for each of said plurality of spatially separated cameras wherein said facility map is rendered on a graphical user interface display linked to said controllers.

10. The camera system of claim 9, wherein said direction sensor comprises a magnetometer sensor.

11. The camera system of claim 10, wherein said elevation sensor comprises a resistive sensor or a magnetic angle sensor.

12. A method for automatically determining a camera field of view in a camera network, said method comprising:

measuring a horizontal camera direction angle with respect to magnetic north for the field of views of a plurality of spatially separated camera;

generating direction measurement signals corresponding to said measured camera angle directions;

measuring respective elevation angles with respect to a vertical axis of said spatially separated cameras;

generating elevation measurement signals corresponding to said measured elevation angles;

selecting at least one camera having a field of view containing an event of interest as indicated by hazardous physical condition sensors in operable communication with said camera network;

determining the amount of horizontal and/or vertical rotation required to bring an event of interest into the field of view of at least one camera based on a comparison of said at least one camera's direction and elevation measurements to respective predetermined selected camera-event horizontal and vertical bearings between said at least one camera and said event of interest;

rendering a facility map containing location information for each of said plurality of spatially separated cameras; and indicating said selected camera on said plan or map.

13. The method of claim 12, wherein measuring said camera direction angle comprises measuring the camera direction angle using a magnetometer.

14. The method of claim 12, wherein measuring respective elevation angles comprises measuring the elevation angles of said cameras using a resistive sensor or magnetic angle sensor.

15. The method of claim 12, wherein said camera-event horizontal and vertical bearings are calculated using trigonometry from predetermined vertical and horizontal position information of said camera(s) and said event of interest.

16. The method of claim 12, further comprising:

horizontally and/or vertically rotating said at least one selected camera by said determined amounts of horizontal and/or vertical rotation to bring said event of interest into the field of view of said at least one camera.

17. The method of claim 16, wherein said at least one camera is a pan tilt zoom camera, and further comprising:

determining the number of degrees of panning and/or tilting required to bring said event of interest into the field of view of said at least one camera; and panning and/or tilting said at least one camera by said determined amounts of panning and/or tilting to bring said event of interest into the field of view of said at least one selected pan tilt zoom camera.

* * * * *